March 23, 1965  L. M. HOLLEY  3,174,577
SONIC LOGGING IN CASING
Filed July 3, 1959  2 Sheets-Sheet 2
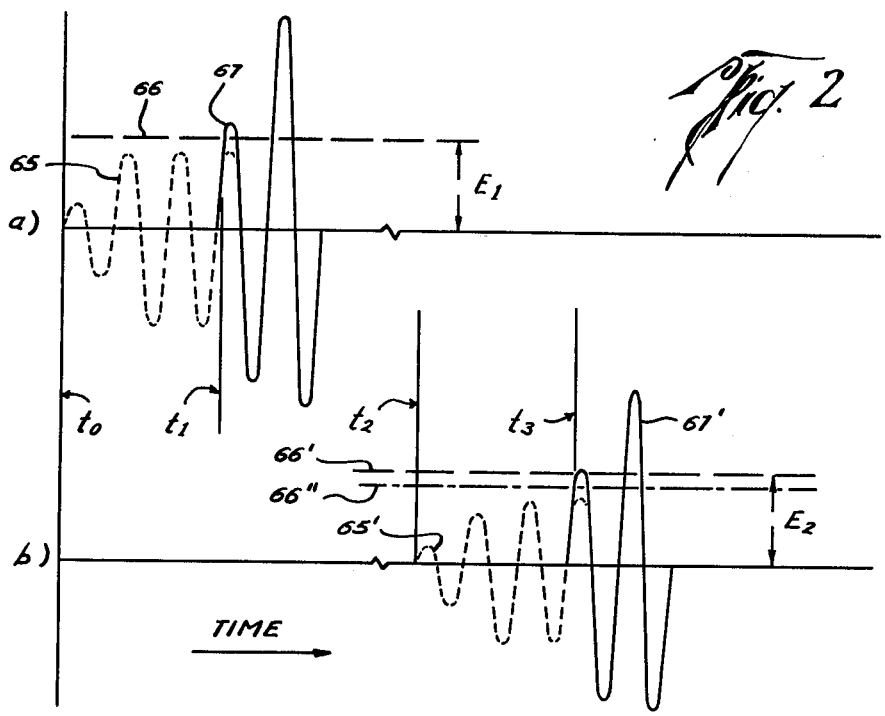
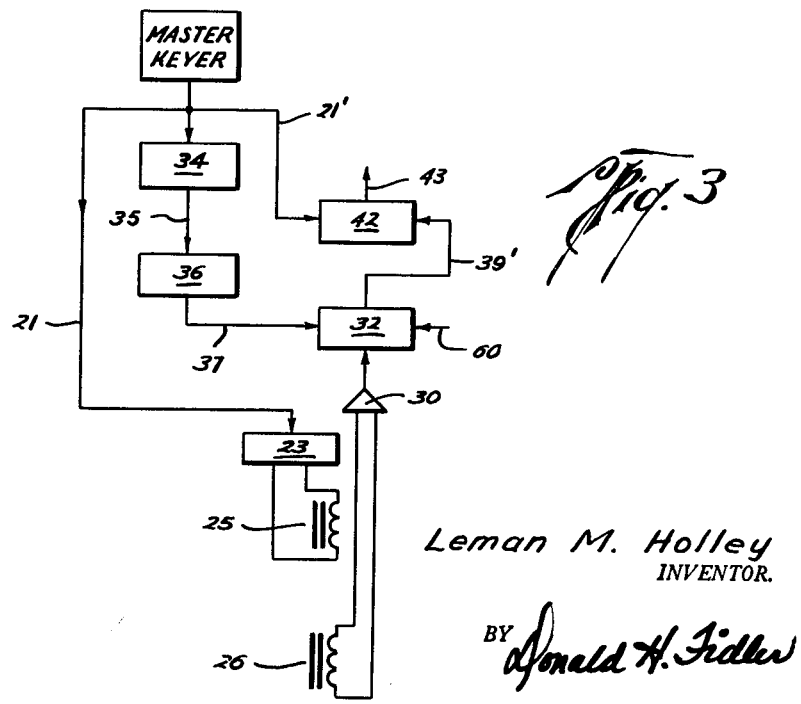
Leman M. Holley
INVENTOR.
BY Donald H. Fidler
ATTORNEY

United States Patent Office 3,174,577
Patented Mar. 23, 1965

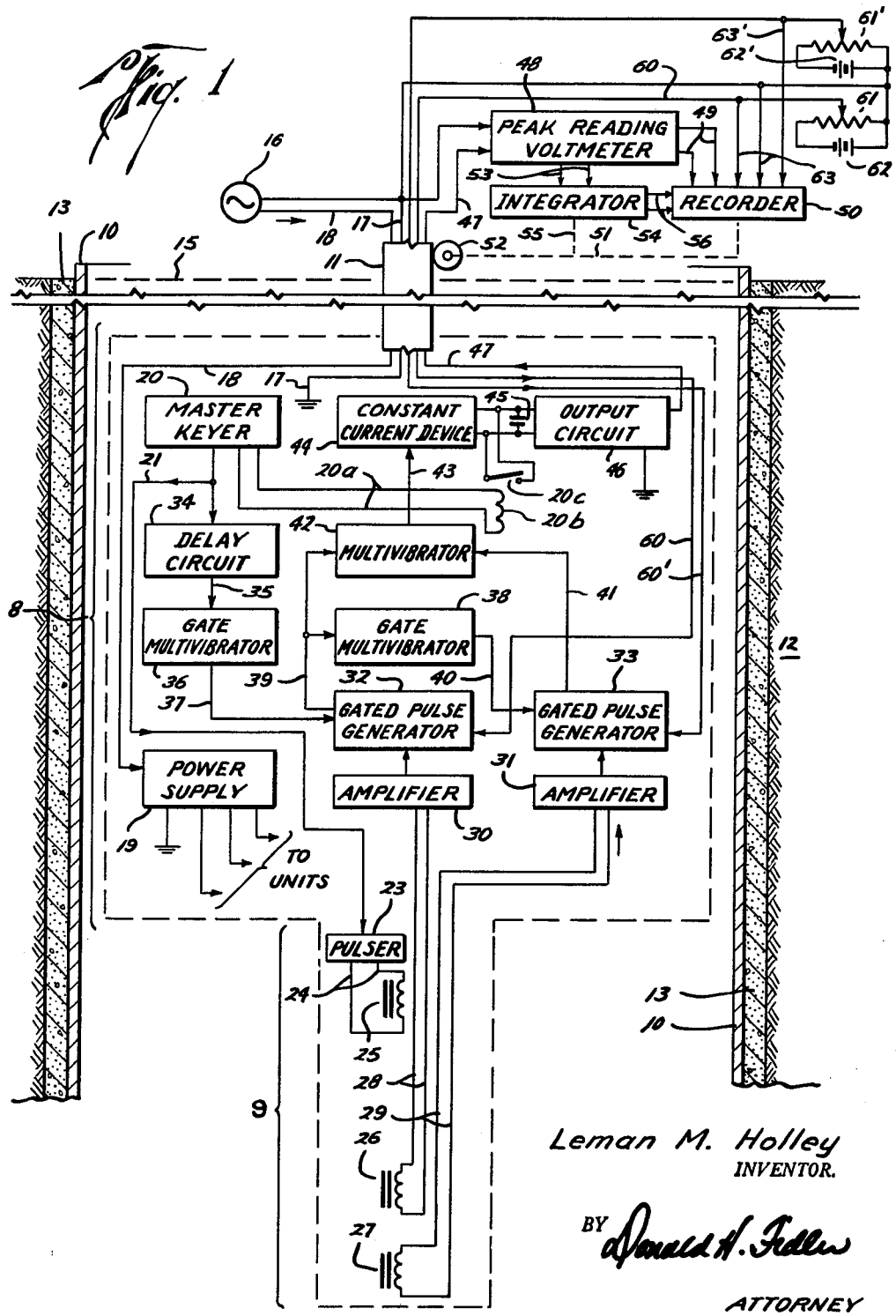

3,174,577
SONIC LOGGING IN CASING
Leman M. Holley, Wichita, Kans., assignor to Schlumberger Well Surveying Corporation, Houston, Tex., a corporation of Texas
Filed July 3, 1959, Ser. No. 824,837
14 Claims. (Cl. 181—.5)

This invention relates to methods for investigating earth formations and, more particularly, pertains to new and improved methods for determining seismic velocity and other properties of earth formations which are situated behind a casing which traverses a well or borehole.

The measurement of seismic or acoustic velocity has been performed heretofore in uncased or open boreholes by emitting pulses of acoustic wave energy at one location in a borehole and intercepting the acoustic energy that is propagated through the adjacent earth formations and which arrives at two other locations in the borehole. The intervening time between the reception of first arrivals at the two receiving locations may then be used to provide indications related to travel time, a quantity inversely related to acoustic velocity. In general, this method has been used with considerable success and is presently gaining in commercial acceptance. However, it has been generally accepted that this system is unsuitable for logging cased boreholes. This is because the velocity of acoustic energy through the casing is about 17,000 feet per second as compared with the range of velocities of 5,000 to 25,000 feet per second commonly encountered in earth formations. Thus, the indications of the intervening time between the first arrivals have been indicative of the acoustic velocity through casing rather than the formations.

It is an object of the present invention to provide certain improvements for measuring transit times of acoustic velocity of acoustic energy traveling in an earth formation behind a casing.

Another object of the present invention is to provide new and improved methods for obtaining indications related to acoustic or seismic velocity of acoustic energy traveling in an earth formation behind a casing while at the same time deriving indications related to attenuation characteristics of the acoustic energy coupled through the casing.

Still another object of the present invention is to provide new and improved methods of locating cement tops.

In accordance with the present invention, to investigate earth formations traversed by a borehole, acoustic energy is passed along paths which include both the casing and the earth formations. The acoustic energy is intercepted and translated into electrical signals representative of the acoustic energy and thereafter discrimination between the relative amplitude of signals representing the acoustic energy passing along the paths provides indications which are related to the travel time of acoustic wave energy passing through the formations.

The novel features of the present invention are set forth with particularity in the appended claims. The present invention, both as to its organization and manner of operation, together with further objects and advantages thereof, may best be understood by reference to the following description taken in connection with the accompanying drawings in which:

FIG. 1 is a schematic diagram in block form of acoustic well logging apparatus which may be employed to perform a method in accordance with one embodiment of the present invention.

FIG. 2 is a representation of certain signals useful in explaining the present invention and FIG. 3 illustrates a modification which may be made to the apparatus shown in FIG. 1.

In FIG. 1 of the drawings, apparatus for performing a method of investigating earth formations embodying the present invention is shown to comprise a borehole instrument including an upper, electronic section 8 and a lower transducer section 9 enclosed by appropriate pressure-tight housings capable of withstanding hydrostatic pressures encountered in a casing 10 where the unit is suspended by means of an armored, electric cable 11. Casing 10 is bonded to the earth formations 12 by annulus 13 of cement in a well-known manner. The casing 10 traverses earth formations 12 and by means of the cable 11 and a conventional winch (not shown) the unit 8, 9 may be passed through the casing in order to obtain useful information concerning characteristics, such as acoustic velocity, of the earth formations 12. The casing is filled with a fluid medium 15 which completes a sound transmission path between the transducer section 9 and the casing 10. The unit is preferably centered in the casing 10 by means of conventional centralizers (not shown).

Electrical energy from an alternating current generator 16 at the surface of the earth is supplied via conductors 17 and 18 of cable 11 and appropriate ground connections to a conventional power supply 19 within electronic section 8. The power supply 19 converts the applied alternating current to unidirectional potentials of appropriate magnitudes for operating the various circuit elements within electronic section 8 and in section 9.

A master keyer 20 which may be a conventional free-running multivibrator or a multivibrator synchronized with the frequency of source 16 supplies repetitive master keyer pulses at 100 millisecond intervals, for example, over a conductor 21 to a conventional pulser 23. In synchronism with each applied pulse, pulser 23 supplies a pulse of high current having a duration of, for example, one microsecond over leads 24 to a transmitting transducer 25 which may be of the magnetostriction type. Preferably, both the pulser 23 and the transducer 25 are located in the upper end of transducer section 9.

To derive electrical signals in response to acoustic energy, a first receiving transducer 26 and a second receiving transducer 27 are positioned below the transmitter 25 in the recited order. The receivers 26 and 27 may be of the magnetostriction type and may be spaced from one another approximately three feet. The upper receiver 26 also may be spaced from the transmitter 25 a distance of three feet. These distances, however, may be set at any desired values. Alternatively, by using one or more additional receivers, two or more spacings of receivers may be employed for obtaining two or more measurements on the same trip into a borehole.

The receivers 26 and 27 are coupled by leads 28 and 29 to respective pulse amplifiers 30 and 31 whose output circuits are coupled to individual conventional gated pulse generators 32 and 33. These pulse generators are of conventional construction arranged so that no output signal is produced unless a control pulse is supplied to a control circuit.

To derive control pulses for generator 32, an extension of lead 21 from master keyer 20 is connected to the input circuit of a delay circuit 34 which provides a delay of approximately 140 microseconds. Delay circuit 34 is connected by a lead 35 to a conventional gate multivibrator 36 which generates a pulse of approximately 700 microseconds duration that is supplied via a lead 37 to the control circuit of pulse generator 32. A gate multivibrator 38 that is similar to gate multivibrator 36 has its input circuit connected by a lead 39 to the output circuit of pulse generator 32, and its output circuit is connected by a lead 40 to the control circuit of a gated pulse generator 33. The purpose of this type of connection will be more apparent from the discussion to follow.

Output lead 39 of generator 32 and output lead 41 of generator 33 are connected to respective input circuits of a conventional multivibrator 42 which provides a pulse whose duration is dependent upon the time interval between the pulses applied to its input circuit. To derive an indication of travel time, the output circuit of multivibrator 42 is connected by a lead 43 to a conventional constant current device 44 arranged to charge a condenser 45 in its output circuit in relation to the duration of each applied pulse. Master keyer 20 is connected by leads 20a to the operating coil 20b of a relay having normally open contact 20c connected across condenser 45. The signal at leads 20a is arranged to be in the form of a pulse which begins approximately 70 milliseconds after each master keyer pulse and of 30 milliseconds in duration. Accordingly, the condenser 45 is short circuited and is thus discharged and so remains during the 30 millisecond interval preceding each emitted pulse. At the condenser 45 there thus appears a pulse signal whose amplitude is dependent upon the duration of the pulse supplied by multivibrator 42. The condenser is connected to an output circuit comprised of a conventional amplifier and cathode follower (not shown), in turn, connected by an insulated conductor 47 of cable 13 and appropriate ground connections to a conventional peak-reading voltmeter 48 at the surface of the earth. The voltmeter output is connected by leads 49 to a recorder 50 in which, through a conventional linkage 51 and a measuring wheel 52, the recording medium is transported in proportion to movement of cable 11. The voltmeter is also connected by leads 53 to a conventional integrator 54 for integrating total travel time. This integrator may, for example, be of the ball-and-disc type in which the disc is coupled to and driven by measuring wheel 52 via a linkage 55. The position of the ball is determined in accordance with the output of peak-reading voltmeter 48. The integrator 54 may be arranged, for example, to provide an output pulse for each millisecond of travel time. The resulting pulses are applied to recorder 50 and their number when counted as a function of depth on the record represents integrated travel time.

To perform the method in accordance with the present invention, gated pulse generators 32 and 33 are of the type that produce output pulses only in response to the application of input pulses exceeding a given level. This may be conveniently accomplished by adjusting the bias on these generators in a conventional manner. Thus, a lead 60 extends from the surface through cable 13 to the bias-control circuit (not shown) of generators 32. The voltage on lead 60 may be adjusted by means of a potentiometer 61 connected in parallel with a battery 62. In order to obtaini a record of the voltage supplied to the control circuits of generator 32, the potentiometer 61 is connected by leads 63 to recorder 50. Similarly, a lead 60' extends from the surface through cable 11, to the bias-control circuit (not shown) of generator 33. The voltage on lead 60' may be adjusted by means of a potentiometer 61' connected in parallel with a battery 62'. In order to obtain a record of the voltage supplied to the control circuits of generator 33, the potentiometer 61' is connected by leads 63' to recorder 50.

In operation, the unit 8, 9 is lowered in the casing by means of cable 11 and, as it is subsequently raised, repetitive pulses are emitted from transmitting transducer 25 and propagated through the casing and bonded cement into adjacent earth formations 12.

The pulse on lead 21 which operates pulser 23 thereby to generate a transmitted pulse is also supplied to delay circuit 34 and 140 microseconds later a pulse triggers multivibrator 36. The multivibrator 36 provides a negative-going pulse whose leading edge is synchronized with the pulse from delay circuit 34 and whose trailing edge occurs 700 microseconds later. This control pulse is supplied over lead 37 to condition pulse generator 32 for operation. Accordingly, when the signal representing a first arrival pulse of acoustic energy is supplied by receiving transducer 26 to the amplifier 30, the amplified pulse causes generator 32 to generate an output pulse at lead 39. This pulse triggers multivibrator 38 and the resulting control pulse having its leading edge synchronized with the pulse from generator 32 and its trailing edge occurring 700 microseconds later, is applied over lead 40 to the control circuit of pulse generator 33. Generator 33 is thus operatively conditioned and when the signal representing acoustic energy incident upon receiving transducer 27 is translated by amplifier 31, generator 33 is triggered. The pulse from generators 32 and 33 are supplied to multivibrator 42 which generates a pulse having a duration representing the time spacing or interval $\Delta t$ between the applied pulses. The latter pulse is supplied to constant current device 44.

Constant current device 44 causes the condenser 45 to charge linearly and this occurs for the duration of each pulse from the multivibrator 42. Accordingly, the condenser attains a charge voltage which is proportional to the duration of the applied pulse. Thirty milliseconds before the next cycle of operation begins, the pulse at leads 20a energizes coil 20b thereby closing contact 20c and the condenser is discharged. These contacts open just prior to the next cycle of operation.

It is evident that the charge voltage on condenser 45 represents the time interval ($\Delta t$) between pulses received at transducers 26 and 27 and, of course, the reciprocal of this quantity represents the acoustic velocity of the adjacent earth formations. Circuit resistance across the condenser is kept to a minimum so that the condenser remains at the particular charge voltage until it is short circuited by contacts 20c. The foregoing cycle is repeated with each master keyer pulse and voltage pulses are developed at condenser 45 of amplitudes representing travel time. These pulses are supplied via the output circuit 46 and cable conductor 47 to the peak-reading voltmeter 48 and the resulting voltage is supplied to the recorder 50. Thus, a continuous log is derived representing the transit time (or acoustic velocity) of the earth formations 12.

The integrator 54 provides a series of voltage pulses whose time spacing represents the integrated values of travel time. This voltage is also supplied to recorder 50 and the two records provide extremely useful data concerning the properties of earth formations 12.

To facilitate an understanding of the present invention it should be understood that the pulse of energy from the pulser 23 is transmitted to the formations 12 by virtue of the cement bond between the formations 12 and casing 10. Also, the velocity of acoustic energy through the formations may be higher or lower than the velocity of the acoustic energy passing through the casing. However, the cement bonding between the casing and formations very greatly attenuates the acoustic energy traveling through the casing so that the casing signal arriving at receiver 26 has a relatively lower energy level than the acoustic energy which arrives at receiver 26 through the formation. The acoustic energy which arrives at the second receiver 27 is even further attenuated relative to the energy which arrives at the first receiver 26. Thus, the movable contacts of potentiometers 61, 61' may be adjusted to a position wherein the generators 32, 33 are triggered only when the amplified signal from amplifiers 30, 31 exceeds a given bias level where the given bias level is greater than a signal representing the energy traveling through the casing but less than a signal representing the energy traveling through the formations.

Referring now to FIG. 2, the signal conditions are illustrated by waveforms (not to scale) which further illustrate the above explanation. As shown in FIG. 2a, the casing signal represented by dotted curve 65 arrives at receiver 26 at a time $t_0$ and has less energy (represented by amplitude) than the given bias level 66 set at a value $E_1$. The bias level 66 is represented by a magnitude $E_1$ on the upper or positive portion of the amplitude scale for convenience of explanation although the bias actually may have a negative polarity. Thus, the amplitude of the casing signal does not exceed the bias level 66 and does not trigger the pulse generator 32. However, the first positive swing of the formation signal 67 which arrives subsequent to the casing signal 65 does exceed the bias level 66 and the generator 32 thereby produces a pulse to actuate multivibrators 38 and 42 at a time $t_1$.

As shown in FIG. 2b, the casing signal 65' arriving at receiver 27 at a subsequent time $t_2$ is further attenuated and does not exceed the bias level 66'. However, the first positive swing of the formation signal 67', although attenuated, does exceed the bias level 66' at a time $t_3$. Thus, the generator 33 produces a pulse to actuate multivibrator 42 at a time $t_3$. The multivibrator 42 and constant current device 44 being turned "on" at $t_1$ and "off" at $t_3$ thereby produces an indication of the time interval $\Delta t$ between the formation signals 67, 67' arriving at the receivers 26 and 27 by developing a voltage pulse on condenser 45 in the manner described heretofore.

The magnitude $E_2$ of the bias level 66' may be adjusted to be equal to the magnitude $E_1$ by appropriate adjustments of potentiometers 61, 61'. However, by the independent adjustment of bias level 66', the magnitude $E_2$ may be decreased, for example, to the level 66'', to increase the sensitivity of the second receiver to the attenuated signal 67'.

To set the proper bias level 66, 66' and thereby eliminate the casing signal, as the apparatus is passed through the borehole, the bias levels 66, 66' are adjusted to similar values. If the levels 66, 66' are low enough to detect the casing signal, the $\Delta t$ indication will be approximately 171 microseconds for a three-foot spacing between the receivers. Since the time between complete cycles of alternation or swings of the signals, using a transmitter frequency of 30 kilocycles is on the order of 33 microseconds if the recorded time interval $\Delta t$ is 204 microseconds or 237 microseconds, for example, it will be readily apparent that the level 66' is exceeded by the second or third positive peaks of signal 65' and is skipping cycles. Thus, the signal 65' is still a casing signal. The bias levels 66, 66' are increased until the $\Delta t$ indication is no longer 171 microseconds or a value increased by a multiple of 30 microseconds so that the $\Delta t$ indication obtained must be responsive to the acoustic energy represented by formation signals 67, 67'.

In a well bore where cement has been pumped between the casing and well bore, the top of the column of cement or cement top may be easily located by the use of the present invention by observing the transition of the $\Delta t$ from that of the formations to a $\Delta t$ indication indicative of casing signals. The transition occurs when the cement top is reached and the acoustic energy is no longer transmitted to the formations. Thus, the energy is confined to the casing since no cement bonding is present to attenuate the casing signal and the $\Delta t$ indication is in response to the casing signal only.

In FIG. 3, a modified circuit arrangement is shown wherein a single receiver 26 is employed. In this embodiment the receiver 27, amplifier 31, pulse generator 33, multivibrator 38 may be omitted and the remaining components arranged so that when the master keyer 20 produces a pulse for the pulser 23, the pulse is also supplied via a conductor 21' to the multivibrator 42 to turn the multivibrator "on." Thereafter as the acoustic energy arriving at receiver 26 produces an amplified signal which is applied to the pulse generator 32, the pulse generator 32 produces a pulse which is supplied via conductor 39' to multivibrator 42 to turn the multivibrator "off." Hence, the time interval $\Delta t$ between the transmitted energy and received energy will provide an indication of the velocity of the formations between the transmitter and receiver. It will be apparent that the bias level on pulse generator 32 is similarly adjusted as above described to eliminate the casing signal.

From the foregoing description, it is evident that the methods embodying the present invention provide information concerning travel time characteristics of the earth formations and in addition provides indications of another property, such as attenuation. It is further evident that the method may be carried out with the usual form of acoustic velocity logging equipment by making very simple modifications.

While particular embodiments of the present invention have been described, it is apparent that changes and modifications thereof may be made without departing from the invention in its broader aspects, and therefore the aim in the appended claims is to cover all such changes and modifications as fall within the true spirit and scope of the invention.

What is claimed is:

1. The method of investigating the properties of earth formations which are traversed by a borehole containing a metallic casing which has been cemented to the formations comprising the steps of: generating a sharp pulse of acoustic energy at a first location in the casing wherein the acoustic energy travels through both the casing and earth formations; intercepting acoustic energy at a second location spaced from said first location; translating said intercepted acoustic energy into electrical signals, said signals representing energy passing through said casing and energy passing through the earth formations; establishing a signal amplitude level equal to the amplitude of the signals representing energy passing through the casing; limiting said signals to only electrical signals exceeding said signal amplitude level; and deriving from the time of occurrence of signals exceeding said signal amplitude level an indication for determining the travel time of acoustic energy through said formations.

2. The method of investigating the properties of earth formations which are traversed by a borehole containing a metallic casing which has been cemented to the formations comprising the steps of: generating a sharp pulse of acoustic energy at a first location in the casing wherein the acoustic energy travels through both the casing and earth formations; detecting the acoustic energy arriving at a second location along the borehole and translating said detected acoustic energy into corresponding electrical signals; establishing a given signal amplitude level representative of acoustic energy traveling through said casing; generating an electrical pulse with electrical means at a time representing the instant when a portion of said electrical signals exceeds said given amplitude, varying the value of said given amplitude in such electrical means to cause said pulse to be generated only upon the first arrival of acoustic energy having a magnitude which said formations are capable of transmitting via a cement bond with said casing, said electrical pulse providing an indication for determining the travel time of acoustic energy through said formations.

3. The method of investigating the properties of earth formations which are traversed by a borehole containing a metallic casing which has been cemented to the formations comprising the steps of: generating a sharp pulse of acoustic energy at a first location in the casing wherein the acoustic energy travels through both the casing and earth formations; intercepting the acoustic energy at second and third locations spaced from one another and from said first location; translating said intercepted acoustic energy into electrical signals, said signals representing energy passing through said casing and energy passing through the earth formations; establishing for each of said second and third locations a signal amplitude level equal to the amplitude of the signals representing energy passing through the casing, limiting said signals to only electrical signals exceeding said respective signal amplitude levels; and deriving from the times of occurrence of signals exceeding said signal amplitude levels indications for determining the travel time of acoustic energy through said formations between said second and third locations.

4. A method of investigating earth formations traversed by a borehole wherein the earth formations are located behind a metallic casing which is cemented to the borehole and wherein the acoustic velocity of said formations is different than the acoustic velocity of said casing comprising the steps of: generating a sharp pulse of acoustic energy at a first location which travels along first and second paths, said first path including a section of said casing and said second path including a section of said earth formations; intercepting the generated acoustic energy at second and third locations spaced from one another and from said first location; translating said intercepted energy into electrical signals representing energy passing through casing and energy passing through said earth formations; establishing at each of said second and third locations a signal amplitude level equal to the amplitude of the signal representing energy passing through the casing; comparing at each of said second and third locations the relative amplitude of said signals representing acoustic energy passing along said second path with the respective signal amplitude levels established thereat; and obtaining from said comparisons indications of the properties of the earth formations in response to the acoustic energy passing along said second path through said earth formations.

5. A method of investigating earth formations traversed by a borehole wherein the earth formations are located behind a metallic casing which is cemented to the borehole comprising the steps of: generating a sharp pulse of acoustic energy at a first location which travels along first and second paths, said first path including a section of casing, said second path including a section of earth formations, successively intercepting the generated acoustic energy at second and third locations spaced from one another and from said first location, at each of said second and third locations translating said intercepted acoustic energy into electrical signals, establishing a signal amplitude level equal to the amplitude at each location of the signals representing energy passing through the casing, limiting said signals to only electrical signals exceeding said respective signal amplitude levels, detecting from the first occurrences of said limited signals the first arrivals at said second and third locations of acoustic energy passing through said formations, and obtaining indications from said detected times of first arrival at said second and third locations for determining the travel time of the acoustic energy in earth formations having a lower acoustic velocity than said casing and located therebehind.

6. A method of investigating earth formations traversed by a borehole wherein the earth formations are located behind a metallic casing which is cemented to the borehole comprising the steps of: generating a sharp pulse of acoustic energy at a first location which travels along first and second paths, said first path including a section of casing, said second path including a section of earth formations, intercepting the generated acoustic energy at a second location spaced from said first location, translating said last-mentioned intercepted energy into first electrical signals representative of the energy passing through said paths, intercepting the generated acoustic energy at a third location spaced from said second location, translating said last-mentioned intercepted energy into second electrical signals representative of the energy passing through said paths, establishing at said second and third locations first and second signal amplitude levels respectively equal to the amplitudes of the signals representing energy passing through the casing, limiting said signals at the respective locations only to signals exceeding said first and second signal amplitude levels, and comparing the times of first occurrence of said limited signals at said second and third locations to obtain an indication of a charateceristic of the formations.

7. A method of investigating earth formations traversed by a borehole wherein the earth formations are located behind a metallic casing which is cemented to the borehole comprising the steps of: generating a sharp pulse of acoustic energy at a first location which travels along first and second paths, said first path including a section of casing, said second path including a section of earth formations, intercepting the generated acoustic energy at a second location spaced from said first location, translating said last-mentioned intercepted energy into first electrical signals representative of the energy passing through said paths, intercepting the generated acoustic energy at a third location spaced from said second location, translating said last-mentioned intercepted energy into second electrical signals representative of the energy passing through said paths, establishing at said second and third locations given signal amplitude levels, detecting with electrical means portions of said first and second signals which exceed said given levels of amplitude, varying the detecting levels of said electrical means until said levels are greater than the amplitude of signals representing energy passing through casing but less than the amplitude of signals representing energy passing through the earth formations and obtaining indications of the times at which said first and second signals first exceed the amplitudes of signals representing energy passing through the casing.

8. A method of investigating earth formations traversed by a borehole wherein the earth formations are located behind a metallic casing which is cemented to the borehole comprising the steps of: generating a sharp pulse of acoustic energy at a first location which travels along first and second paths, said first path including a section of casing, said second path including a section of earth formations, intercepting the generated acoustic energy at a second location spaced from said first location, translating said last-mentioned intercepted energy into first electrical signals representative of the energy passing through said paths, intercepting the generated acoustic energy at a third location spaced from said second location, translating said last-mentioned intercepted energy into second electrical signals representative of the energy passing through said paths, establishing at said second and third locations given signal amplitude levels, detecting with electrical means the first arrival of said first and second signals which exceeds said given levels of amplitude, varying the detecting levels of said electrical means until said levels are greater than the amplitude of signals representing energy passing through casing but less than the amplitude of signals representing energy passing through the earth formations, and obtaining an indication of the time interval between the first arrivals of said first and second signals which exceed the given level of amplitude.

9. The method of investigating the properties of earth formations which are traversed by a borehole containing a metallic casing which has been cemented to the formations comprising the steps of: generating successive sharp pulses of given acoustic energy; intercepting said pulses at second and third locations spaced from said first location; translating said intercepted acoustic energy into electrical signals, said signals representing acoustic energy which has arrived at said second and third locations via said casing and the earth formations therebehind, establishing at said second and third locations signal amplitude levels representing acoustic energy passing through said casing, and limiting said signals to only electrical signals exceeding an amplitude of signals representing energy passing through said casing to signals exceeding said signal amplitude levels, and deriving from the times of occurrence of said limited signals indications of the travel time for the acoustic energy traversing such formations.

10. The method of investigating the properties of earth formations which are traversed by a borehole containing a metallic casing which has been cemented to the formations comprising the steps of: generating successive sharp pulses of given acoustic energy; intercepting said pulses at second and third locations spaced from said first location; translating said intercepted acoustic energy into electrical signals, said signals representing acoustic energy which has arrived at said second and third locations via said casing and the earth formations therebehind, establishing at said second and third locations signal amplitude levels representing acoustic energy transmitted via portions of said casing which are cement bonded to said earth formations, and limiting said signals to only those portions of said electrical signals which have amplitudes exceeding said signal amplitude levels, and deriving from said limited signals indications of an acoustic energy transmitting characteristic of said formations.

11. The method of locating the top of a column of cement contained between a metallic casing and a borehole which traverses earth formations comprising the steps of: generating a sharp pulse of acoustic energy at a first location at a depth in the casing wherein the acoustic energy travels through both the casing and earth formations; intercepting acoustic energy at a second location spaced from said first location; translating said intercepted acoustic energy into electrical signals, said signals representing energy passing through said casing and energy passing through the earth formations; establishing a signal amplitude level equal to the amplitude of signals representing energy passing through said casing; limiting said signals to only electrical signals exceeding said signal amplitude level; and varying the depth at which the locations are disposed in the well for obtaining indications when the signals representing energy passing through said casing exceed the signal amplitude level thereby indicating a lack of cement behind the casing.

12. The method of investigating the properties of earth formations which are traversed by a borehole containing a metallic casing which has been cemented to the formations comprising the steps of: generating a sharp pulse of acoustic energy at a first location in the casing wherein the acoustic energy travels through both the casing and earth formations; deriving an electrical signal representative of said sharp acoustic pulse; intercepting acoustic energy at a second location along the borehole spaced from said first location; translating said intercepted acoustic energy into electrical signals; establishing a signal amplitude level equal to the amplitude of the signals representing energy passing through the casing; limiting said signals to only electrical signals exceeding said signal amplitude level; detecting from said limited signals the time of first arrival of acoustic energy which has traversed a given interval at a speed less than the acoustic velocity in said casing; and deriving from the time of occurrence of said electrical signals representative of said sharp acoustic pulse and said time of first arrival an indication of the travel time of the acoustic energy in earth formations having a lower acoustic velocity than the casing and located therebehind.

13. The method of investigating the properties of earth formations which are traversed by a borehole containing a metallic casing which has been cemented to the formations comprising the steps of: generating a sharp pulse of acoustic energy within the borehole wherein the acoustic energy travels from a first location through both the casing and earth formations; intercepting acoustic energy at a second location along said borehole spaced from said first location; deriving electrical signals representative of the acoustic energy at each of said first and second locations, the signals derived at at least one of said locations representing energy passing through said casing and energy passing through the earth formations; establishing a signal amplitude level equal to the amplitude of the signals representing energy passing through the casing; limiting said derived electrical signals only to electrical signals exceeding said signal amplitude level; and deriving from the times of occurrence of electrical signals at said locations the travel time of acoustic energy through the earth formations therebetween.

14. The method of investigating the properties of earth formations which are traversed by a borehole containing a metallic casing which has been cemented to the formations comprising the steps of: generating a sharp pulse of acoustic energy at a first location in the casing wherein the acoustic energy travels through both the casing and earth formations; intercepting acoustic energy at a second location spaced from said first location; translating said intercepted acoustic energy into electrical signals, said signals representing energy passing through said casing and energy passing through the earth formations; rejecting electrical signals representing energy passing through said casing and detecting electrical signals representing energy passing through the earth formations; and deriving from the detected signals an indication for determining a characteristic of said formations.

References Cited in the file of this patent
UNITED STATES PATENTS

| | | |
|---|---|---|
| 2,238,991 | Cloud | Apr. 22, 1941 |
| 2,691,422 | Summers et al. | Oct. 12, 1954 |
| 2,708,485 | Vogel | May 17, 1955 |
| 2,857,011 | Summers | Oct. 21, 1958 |
| 2,897,476 | Widess | July 28, 1959 |
| 2,981,928 | Crawford et al. | Apr. 25, 1961 |